(12) United States Patent
Bergmann et al.

(10) Patent No.: US 6,374,012 B1
(45) Date of Patent: Apr. 16, 2002

(54) METHOD AND APPARATUS FOR ADJUSTING THE PATH OF AN OPTICAL BEAM

(75) Inventors: Ernest Eisenhardt Bergmann, Borough of Fountain Hill, PA (US); Neal Henry Thorsten, Lebanon, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/410,260

(22) Filed: Sep. 30, 1999

(51) Int. Cl.[7] ............................. G02B 6/32; G02B 9/00
(52) U.S. Cl. ........................... 385/33; 385/34; 385/35; 359/652
(58) Field of Search ............................. 385/35, 34, 33, 385/93; 359/642, 804–830

(56) References Cited

U.S. PATENT DOCUMENTS

| | | | | |
|---|---|---|---|---|
| 5,128,808 A | * | 7/1992 | Dosaka | 359/821 |
| 5,638,472 A | * | 6/1997 | Van Delden | 385/33 |
| 5,815,328 A | * | 6/2000 | Makita | 359/824 |
| 6,072,519 A | * | 6/2000 | Griffith | 347/241 |

* cited by examiner

Primary Examiner—Georgia Epps
Assistant Examiner—Michael A. Lucas
(74) Attorney, Agent, or Firm—Ratner & Prestia

(57) ABSTRACT

A lens assembly is provided to adjust the path of an optical beam. The lens assembly includes a lens positioned along the path of the optical beam. The lens is also positioned for movement in directions parallel to a plane traversing the path of the optical beam. The lens is configured to adjust the path of the optical beam upon movement of the lens in a direction parallel to the plane.

20 Claims, 8 Drawing Sheets

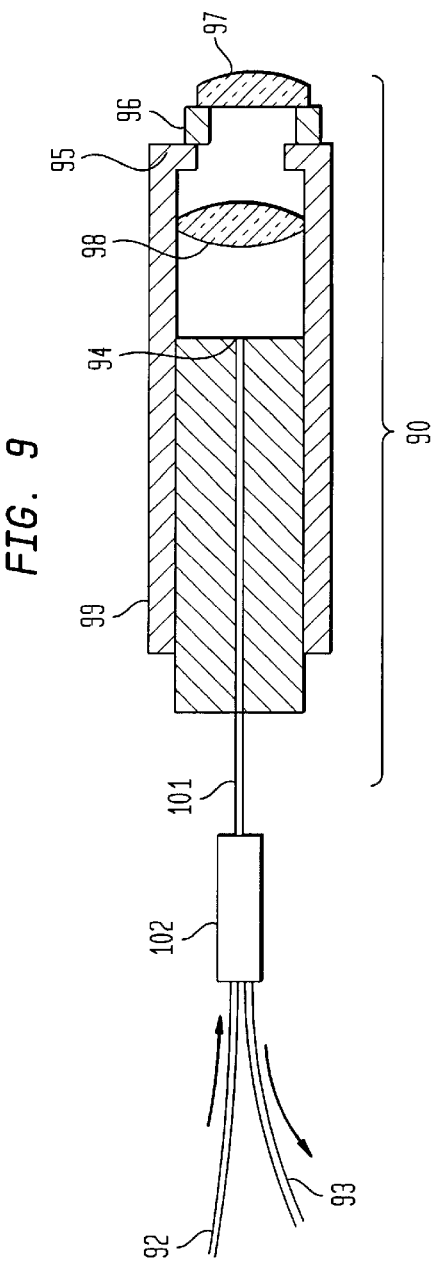
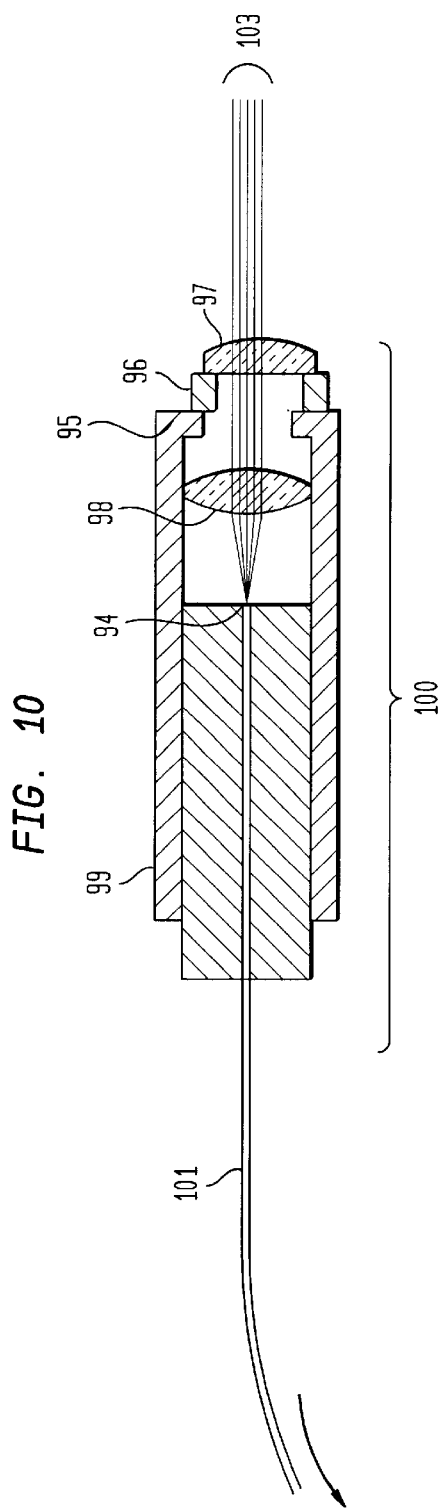

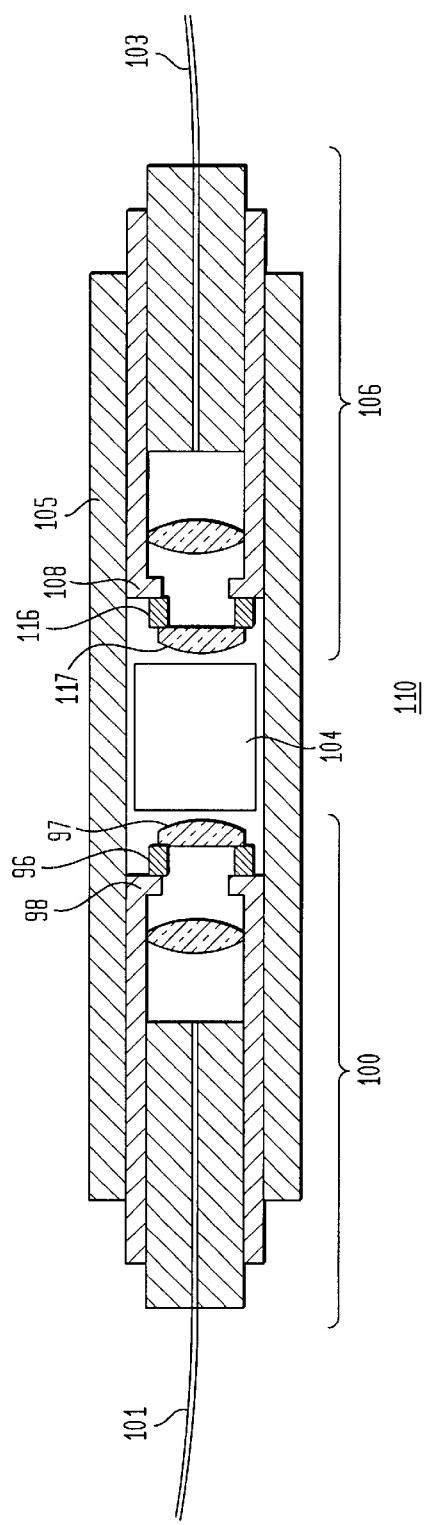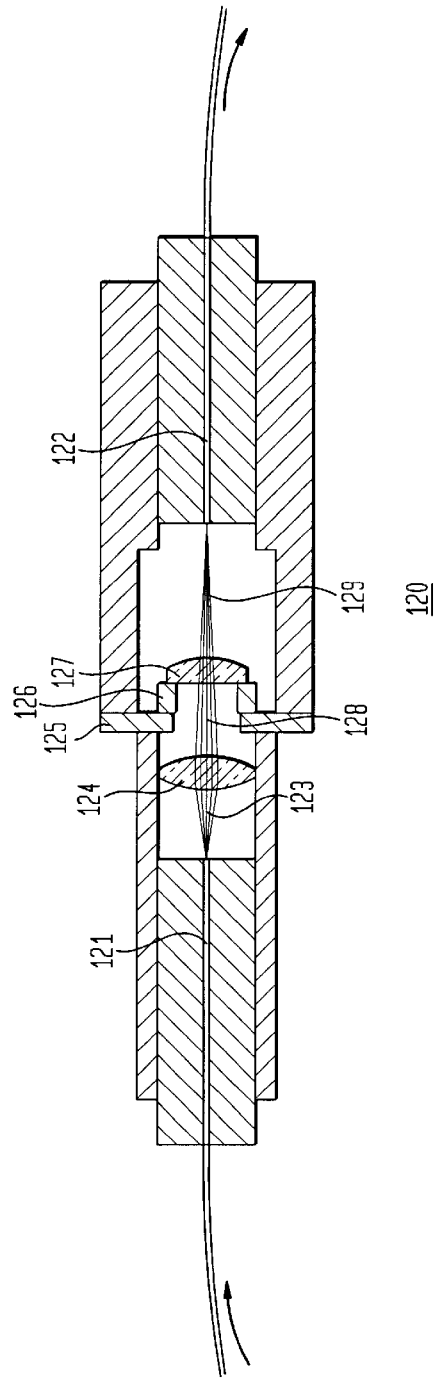

METHOD AND APPARATUS FOR ADJUSTING THE PATH OF AN OPTICAL BEAM

FIELD OF THE INVENTION

This invention relates to a method and apparatus for adjusting the path of an optical beam. In particular, this invention relates to the adjustment of the path of an optical beam within a fiber-optic communication system.

BACKGROUND OF THE INVENTION

Optical communication systems typically utilize devices that work with optical signals. For example, optical fibers are used for short and long distance optical transmission. Other devices can also be used in optical communication systems, including filters, multiplexers, modulators, transmitters, receivers, and power splitters to name a few.

Unlike electronic systems that use wire as an electronic conduit, direction and alignment of optical beams and wave guides in optical systems are of increased importance. The core of an optical fiber has a relatively small diameter. Also, optical fibers have relatively narrow acceptance angles within which light is accepted. Accordingly, the light source should be carefully aligned with a receiving fiber in order to avoid coupling losses and other performance problems.

Over the years, various attempts have been made to adjust the paths of optical beams in order to improve their direction and alignment. For example, approaches to steering the beam output (or input) for a pre-made collimator in fiber-optic packaging applications have been proposed. In some applications, steering may be desired when light is to be coupled into or out of the end or tip of a single-mode fiber within a fiber-optic communication system. In such applications, it may be desirable to correct for any slight lateral misplacements of the fiber's tip.

It is recognized, for example, that laser welding of fibers such as in optical packages can only be controlled to about 1 $\mu$m. It is also recognized that adjustment of a beam path in only one dimension is not always sufficient. Moreover, it has been discovered that adjustments often should be finely "tuned" or "trimmed" after an initial adjustment is made.

Accordingly, there remains a need for an improved method and apparatus for adjusting the path of an optical beam in such a way as to overcome the deficiencies of the prior art. There also remains a need for a method and apparatus that can steer an optical beam in two dimensions when such adjustment is needed.

SUMMARY OF THE INVENTION

This invention provides a lens assembly adapted to adjust the path of an optical beam. The lens assembly includes a support surface positioned adjacent the path of the optical beam, and the support surface defines an aperture through which the optical beam can pass. The support surface is oriented along a plane that traverses the path of the optical beam. A lens of the lens assembly is positioned along the path of the optical beam and extends across the aperture defined by the support surface. The lens is also positioned for movement with respect to the support surface in directions parallel to the plane of the support surface. The lens is configured to adjust the path of the optical beam upon movement of the lens in a direction parallel to the plane of the support surface.

According to another aspect of this invention, a fiber-optic communication system is provided. The communication system includes a fiber-optic cable configured to transmit an optical beam along a path. The fiber-optic cable has an end portion from which the optical beam can be transmitted. A primary lens of the communication system is positioned along the path of the optical beam, and the primary lens is spaced from the end portion of the fiber-optic cable. The primary lens has a focal length selected to converge or diverge the optical beam. A secondary lens of the communication system is also positioned along the path of the optical beam, and the secondary lens is spaced from the primary lens. The secondary lens has a focal length that is larger than that of the primary lens. The secondary lens is positioned for movement along a plane that traverses the path of the optical beam. The secondary lens is configured to adjust the path of the optical beam upon movement of the secondary lens in a direction along the plane.

According to yet another aspect of this invention, a method is provided for adjusting the path of an optical beam transmitted from an end portion of a fiber-optic cable. A primary lens is provided according to the method, with a focal length selected to converge or diverge the optical beam. The primary lens is positioned along the path of the optical beam, and the primary lens is spaced from the end portion of the fiber-optic cable. A secondary lens is provided according to the method, with a focal length that is larger than that of the primary lens. The secondary lens is configured to redirect the optical beam. The secondary lens is positioned along the path of the optical beam, and the secondary lens is spaced from the primary lens. The secondary lens is movable along a plane that traverses the path of the optical beam. The secondary lens is moved in a direction along the plane, thereby adjusting the path of the optical beam.

BRIEF DESCRIPTION OF THE DRAWINGS

The invention will be described with reference to embodiments selected for illustration in the drawings, of which:

FIG. 9 is a cross-sectional side view of an embodiment of a collimator assembly in which a lens assembly according to this invention can be used;

FIG. 10 is a cross-sectional side view of an embodiment of a single-fiber collimator in which a lens assembly according to this invention can be used;

FIG. 11 is a cross-sectional side view of an embodiment of a complete package in which lens assemblies according to this invention can be used; and FIG. 12 is a cross-sectional side view of another embodiment of a complete package in which a lens assembly according to this invention can be used.

DETAILED DESCRIPTION OF THE INVENTION

Figure 1A:
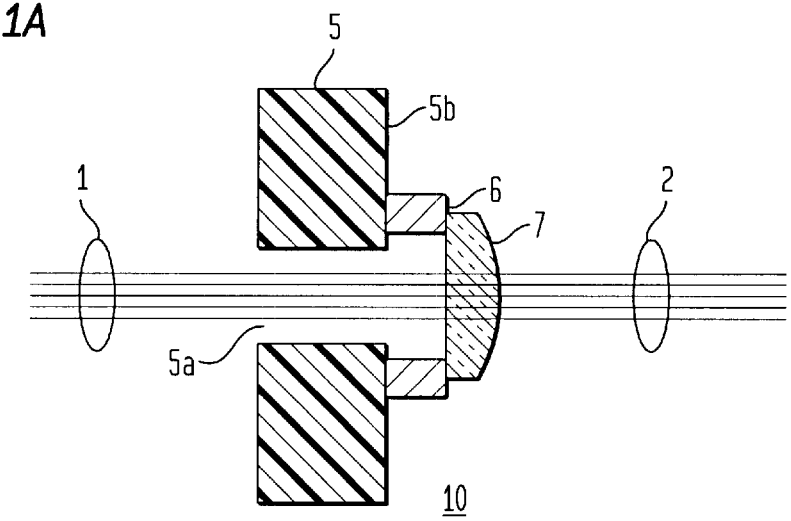
FIGS. 1a, 1b, and 1c are cross-sectional side views of an embodiment of a lens assembly according to this invention.

The invention will now be described with reference to specific embodiments selected for illustration in the drawings. It will be appreciated that the spirit and scope of this invention will not be limited to the selected embodiments. It will further be appreciated that the drawings are not rendered to any particular scale or proportion.

Various approaches have been contemplated for steering beam output (or input). For example, one method for one parameter adjustment is to use the rotation of an optical wedge as proposed in Application Ser. No. 09/145,988, filed Sep. 3, 1998 (pending), which is incorporated herein by reference. Also proposed therein are methods for rotating a collimator assembly itself (if the beam is not exactly along the axis of rotation) and the use of a "ball joint" to permit the collimator assembly to be tilted relative to the rest of the assembly package.

In Application Ser. No. 09/197,982 now U.S. Pat. No. 6,014,270, filed Nov. 23, 1998 (pending), which is incorporated herein by reference, the use of two cylindrical lenses that slide along a plane to provide two degrees of tilt adjustment to an optical beam deflection was proposed. In Application Ser. No. 09/047,553 now U.S. Pat. No. 5,973,860 filed Mar. 25, 1998 (pending), which is incorporated herein by reference, rotating wedged cylinders were proposed to control the deflection of an optical beam. One degree of adjustment is provided by the degree of rotation of each cylinder.

It has been discovered, however, that two degrees of adjustment at one place in the apparatus can be advantageous, especially when "motion conversion or reduction" is provided. Specifically, without motion reduction, one controls the orientation of the part to the same degree as the beam needs to be controlled. In other words, a 0.1° fixturing error will result in a 0.1° pointing error of the optical beam.

A one-degree-of-freedom adjustment can, in some instances, provide the reduction in sensitivity that makes control easier. For example, rotation of the collimator where the beam is 1° different from the axis of rotation (such as described in Application Ser. No. 09/145,988) means that a rotation, for example, of 1° results in a change of orientation of only about 1 minute of arc, and a change of orientation of 2° requires rotation of the collimator by 180°. However, if there is any looseness in the mating of parts, the 1 minute of arc adjustment may still not be achievable in all circumstances.

Also, although the use of transmissive optics may prove beneficial in many applications, the use of transmissive optics such as a wedge or lens may not adequately provide reduced sensitivity to the mounting of these optics. Specifically, if an optical wedge is translated in any direction (say, x, y, or z), the light passing through it will not change its angle of deflection at all. The emergent beam may suffer some translation. This translation is smaller than the translation of the optical wedge approximately by the angle of beam deflection. In the case of a wedge, the beam's deflection is changed by tilting or twisting the wedge. The reduction in sensitivity is again related to the amount of the beam's deflection.

Turning to the present invention, and referring generally to the embodiments illustrated in FIGS. 1–12, this invention provides a lens assembly, such as subassembly 10 illustrated in FIG. 1a, that is adapted to adjust the path of an optical beam such as beam 1. The lens assembly includes a support surface such as that provided by magnetically permeable wall 5. The support surface is positioned adjacent the path of the optical beam 1, and the support surface defines an aperture such as aperture 5a through which the optical beam 1 can pass. The support surface is oriented along a plane that traverses the path of the optical beam 1.

A lens, such as a "weak" lens 7, is positioned along the path of the optical beam 1, and the lens extends across the aperture 5a defined by the support surface. The lens is also positioned for movement with respect to the support surface in directions parallel to the plane of the support surface. The lens is configured to adjust the path of the optical beam, such as at beam 2, upon movement of the lens in a direction parallel to the plane.

Figure 8:
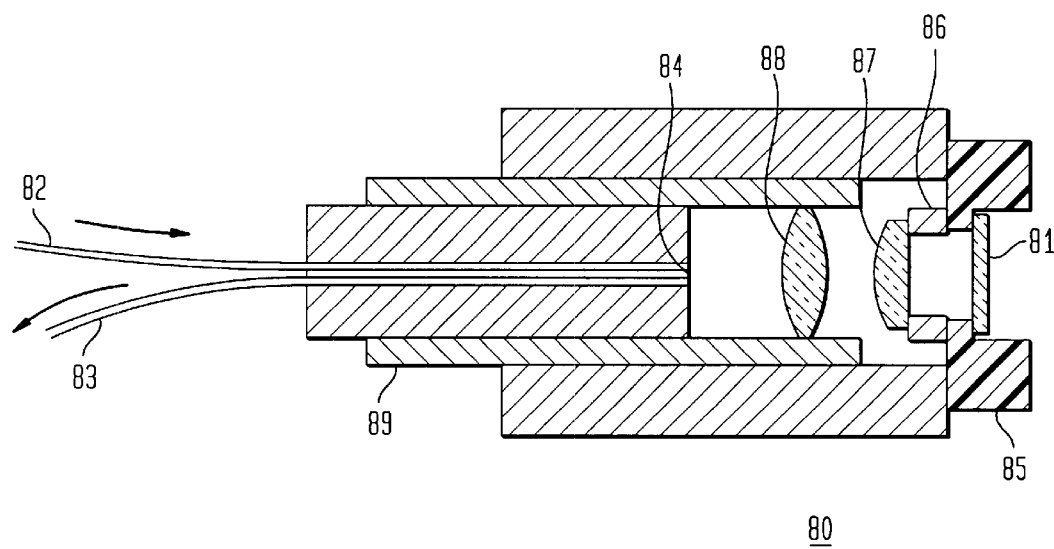
FIG. 8 is a cross-sectional side view of an embodiment of an optical package in which a lens assembly according to this invention can be used.

According to another aspect of the invention, a fiber-optic communication system, such as a system that includes the optical package 80 illustrated in FIG. 8, is provided. The fiber-optic communication system includes a fiber-optic cable, such as fiber 82, configured to transmit an optical beam along a path. The fiber-optic cable has an end portion, such as at dual fiber termination assembly 84, from which the optical beam can be transmitted. A primary lens, such as "strong," collimating lens 88, is positioned along the path of the optical beam, and the primary lens is spaced from the end portion of the fiber-optic cable. The primary lens has a focal length selected to converge or diverge the optical beam as it passes through the primary lens.

A secondary lens such as weak lens 87 is positioned along the path of the optical beam, and the secondary lens is spaced from the primary lens. The secondary lens has a focal length that is larger than that of the primary lens, and the secondary lens is positioned for movement along a plane that traverses the path of the optical beam. The secondary lens is configured to adjust the path of the optical beam upon movement of the secondary lens in a direction along the plane.

The terms "weak" lens and "strong" lens are used herein to indicate the relative strength of lenses used in an optical assembly. Generally, weaker lenses have longer focal lengths. Accordingly, a "weak" lens has a focal length that is longer than that of a "strong" lens. In most circumstances, a "weak" lens will have a focal length that is at least ten times (10×) longer than that of a "strong" lens. Preferably, a "weak" lens will have a focal length at least twenty times (20×) longer than that of a "strong" lens. Most preferably, a "weak" lens according to this invention will have a focal length at least one hundred times (100×) longer than that of a "strong" lens.

Illustrated in FIG. 1a is an approximately collimated beam 1 that passes from left to right through the subassembly 10. The subassembly consists here of a magnetically permeable wall 5 with an aperture 5a through which beam 1 passes. Magnetically attached to wall 5 is a "donut" shaped permanent magnet 6 to which a weak lens 7 is attached. More specifically, wall 5 defines a support surface 5b. The magnet 6, which can also be referred to as a lens holder, is has opposed end portions. One end portion of magnet 6 is positioned in sliding contact with support surface 5b of wall 5. The opposite end portion of magnet 6 provides a surface to which lens 7 is attached.

Although not indicated in FIG. 1, beams 1 and 2 cannot both be precisely collimated because of the action of the lens 7. Specifically, if beam 1 is collimated, then beam 2 will be focused by lens 7 to eventually come to a focus in the secondary focal plane of lens 7. Because lens 7 is comparatively weak, its focussing action upon the collimation of the beam is not shown. Another configuration is that beam 2 can be carefully collimated, but beam 1 is slightly spreading as it travels to the right. It would appear then that beam 1 came through a focus in the primary focal plane of lens 1. It is to be understood that ray tracing could be for the beam traveling right to left as well.

In FIG. 1a, beam 1 is centered on the center of the lens 7. The overall directions of beam 1 and beam 2 are therefore the same. In other words, there is no net beam deflection.

Figure 1B:
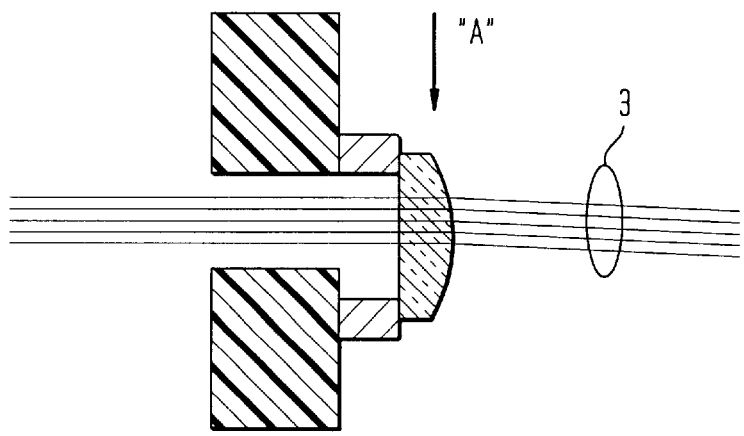

In FIG. 1b, the subassembly consisting of magnet 6 and lens 7 have been pushed down wall 5 in direction "A". Because of the magnetic permeability of wall 5 and the magnetic behavior of magnet 6, the subassembly remains in close contact with the wall. It is a matter of assembly convenience whether the right side or the left side of wall 5 is used for magnetic attachment, and the following optical discussion is unaffected by whether the right or left side of wall 5 is selected. As illustrated in FIG. 1b, beam 1 strikes lens 7 above the lens's center. There is a resulting deflection of the transmitted beam 3 in a downward direction. The more the subassembly of magnet 6 and lens 7 is pushed downward in direction "A", the more the deflection of beam 3 will be downward.

Figure 1C:
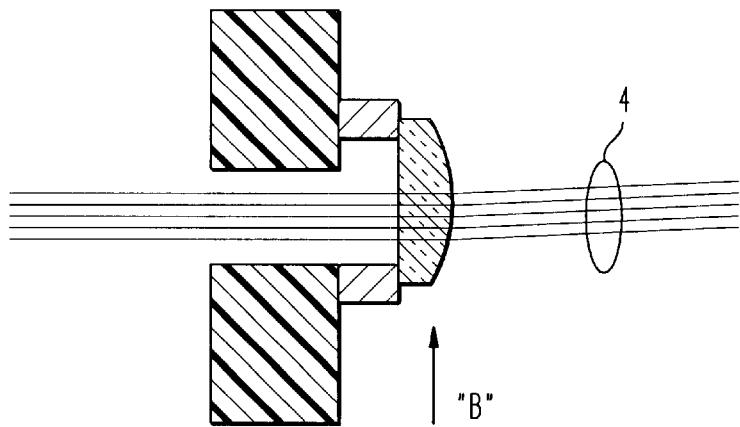

In FIG. 1c, the subassembly of magnet 6 and lens 7 has been pushed up wall 5 in direction "B" as compared to FIG. 1a. Now beam 1 strikes lens 7 below the lens's center and, therefore, the transmitted beam 4 is deflected upward. The more the subassembly of magnet 6 and lens 7 is pushed upward, the more beam 4 will be deflected upward.

Although not shown, the subassembly of magnet 6 and lens 7 can be pushed into the page and the resulting deflection of the transmitted beam will be into the page. Conversely, one can pull the subassembly out of the page and achieve a transmitted beam deflection out of the page. Thus, subassembly 10 can provide deflections over a two-dimensional range using a weak lens.

It is not necessary that the weak lens be "positive". A "negative" lens can be used, as illustrated in the subassembly 20 shown in FIGS. 2a–2c, to form a transmitted beam 12. The beam is deflected by moving the lens 17 in a manner similar to that of lens 7 as illustrated in FIGS. 1a–1c. The main difference is that the beam deflections are in the opposite sense from the lens's motion.

One can quantify the deflections thus described in both FIGS. 1a–1c and 2a–2c by saying that the angle of deflection, θ, expressed in radians, is defined by:

$$\theta = D/F$$

where D is the distance that the lens has been moved from the "no deflection point" (FIGS. 1a and 2a), and F is the focal length of the lens. For the negative lens in FIGS. 2a–2c, the focal length is taken as negative. It is clear that the weaker the lens (the larger $|F|$ is) the less change in the deflection is obtained for a given amount of movement, D.

Although the remaining drawings all show only plano-convex lenses, other lenses can be used instead. In addition to negative lenses one can use HOE (HOlographic Elements) and variable index lenses such as GRINs (GRadient INdex lenses). Of course a variety of techniques can be used, such as contouring both sides of the lens. In a preferred embodiment, the lens 7 (FIG. 1) or 17 (FIG. 2) is attached to the lens holder 6 or 16 (FIGS. 1 and 2, respectively) with an adhesive such as epoxy, but other means can be used (such as soldering, magnetic coatings, etc.).

Lenses that are "off-axis" can be used as well, their action being akin to the serial combination of a centered lens and a wedge. The beam will be deflected by such an off-axis lens, but the detailed amount of deflection will be adjustable. The effects of simple rotation of the lens and lens holder subassembly should be contemplated. Since the use of off-axis lenses are often acceptable, one can fabricate several small lenses by sectioning a larger lens into several pieces.

Although a "donut" shaped magnet is preferred, other shapes are of course possible, including the use of more than one magnet piece. Although the lens is shown as mounted on the magnet's end surface, it could be mounted otherwise such as in the interior or even on the same face that contacts the wall. Also, the lens holder can be provided with a counterbore to form a shoulder that supports the lens. Nevertheless, the use of a donut shaped magnet provides a means to securely hold the lens in position with respect to the wall and, at the same time, provide a means to change that position with a minimal number of components and without the need for springs, which are more difficult to assemble in a manufacturing environment.

The use of a transparent optical element, namely a weak lens, means that even if there is unintentional motion, such as due to thermal expansion or contraction, or due to slight motions induced by the fixturing process (epoxy, solder, welding, etc.), or by sloppiness in the move actuations, very little effect will be seen on the optical alignment. Further, the materials with the greatest dimensional instability, typically epoxy, that might be used in the assembly are most likely to produce motions of the lens due to that instability that are along the direction of the beam propagation, where the least sensitivity to misalignment occurs.

Figure 3A:
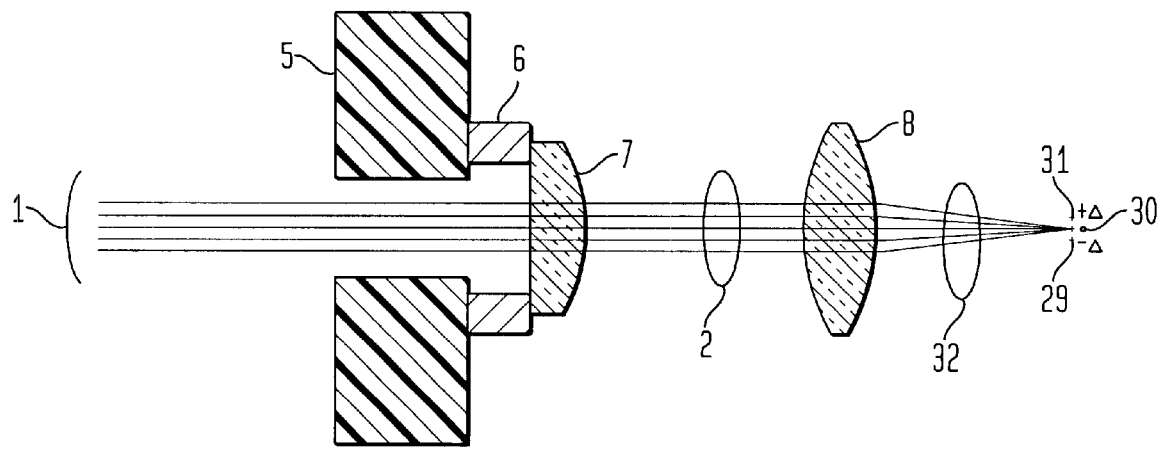
FIGS. 3a, 3b and 3c are cross-sectional side views of the lens assembly illustrated in FIGS. 1a, 1b, and 1c, illustrating an application of the lens assembly.
Figure 3B:
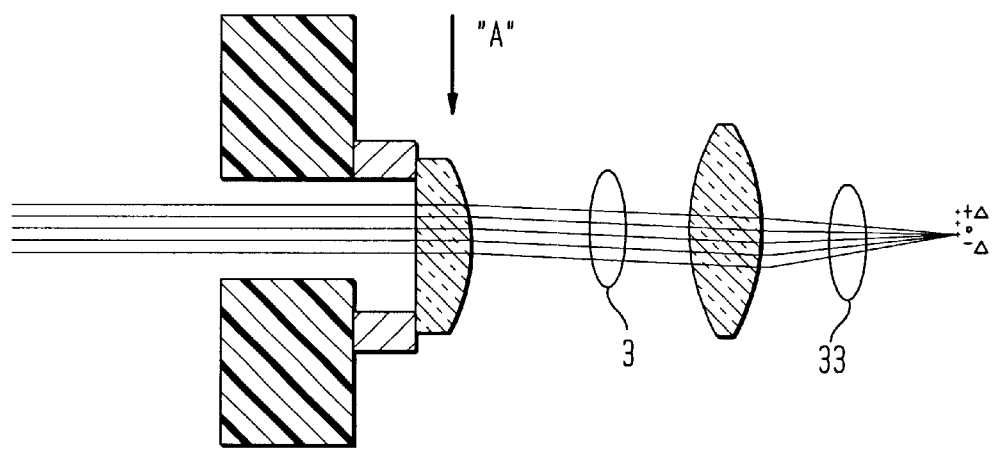
Figure 3C:
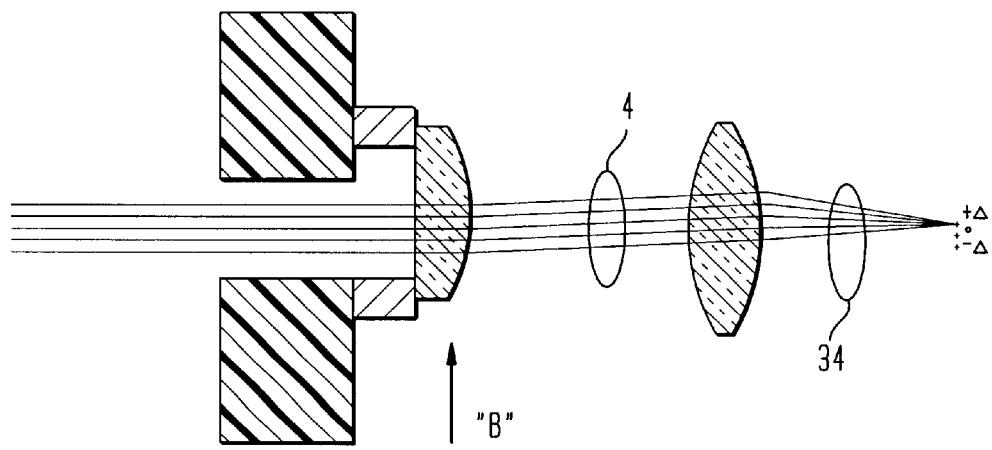

Further details of a lens assembly according to this invention are illustrated in FIGS. 3a–3c; specifically, FIGS. 3a–3c illustrate how tilt control can become fine position control. The left hand sides of FIGS. 3a–3c are actually the same as FIGS. 1a–1c, respectively. FIG. 3a shows the nominal optical system where the imaging of the beam is at the center of the control range. As illustrated in FIG. 3a, a "strong" lens 8 that converts the approximately collimated beam 2 to a converging beam 32 with its diffraction-limited spot at the center of the range 30. The location of weak lens 7 is at the primary focal plane of strong lens 8. The converging beam 32 is therefore horizontal.

In FIG. 3b the subassembly consisting of lens holder 6 and lens 7 are moved downward in direction "A" in a manner described earlier for FIG. 1b so that the transmitted beam 3 is deflected downward. Lens 8 converts beam 3 to a converging beam 33. The downward deflection of beam 3 will cause the diffraction-limited spot of 33 to occur lower on the page at point 29 (defined in FIG. 3a). Because beam 3 appears to be originating from the primary focal point of lens 8, the converging beam 33 will still be horizontal.

In FIG. 3c the subassembly consisting of lens holder 6 and lens 7 are moved upward in direction "B" in a manner described earlier for FIG. 1c so that the transmitted beam 4 is deflected upward. Lens 8 converts beam 4 to a converging beam 34. The upward deflection of beam 4 will cause the diffraction-limited spot of beam 34 to occur higher on the page at point 31 (defined in FIG. 3a). Because beam 4 appears to be originating from the primary focal point of lens 8, the converging beam 34 will still be horizontal.

The amount of motion of the diffraction-limited spot, which can be called "d", will be much less than the movement of the subassembly consisting of lens holder 6 and lens 7, which distance can be called "D". The reduction in motion is related to the relative focal lengths of the weak lens 7 (called F) and the strong lens 8 (called f). The relationship will be:

$$D/d=F/f$$

Thus, if f=2 mm and F=200 mm, a motion reduction of 100:1 is achieved. An exemplary application of this technique is the coupling of light into or out of a single-mode fiber and the correction of slight lateral misplacements of the fiber tip. The fiber tip would nominally be at 30 (FIG. 3*a*), but if it were instead at 29 or 31, the position of the subassembly of lens holder 6 and lens 7 could be adjusted accordingly.

Typically, laser welding of fibers in packages can be controlled only to about 1 μm. This motion of the subassembly of lens holder 6 and lens 7 is comparatively easily controlled (e.g., moved a distance "D") within a few microns. Therefore, an adjustment (e.g., movement of the diffraction-limited spot "d") within hundredths of a micron are possible at the fiber's tip.

Figure 4A:
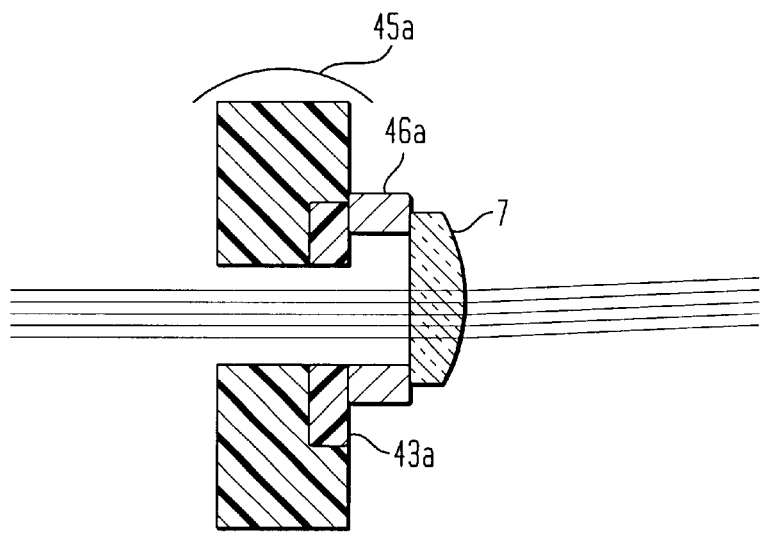
FIGS. 4a, 4b and 4c are cross-sectional side views of additional variations of the lens assembly illustrated in FIGS. 1a, 1b, and 1c.
Figure 4B:
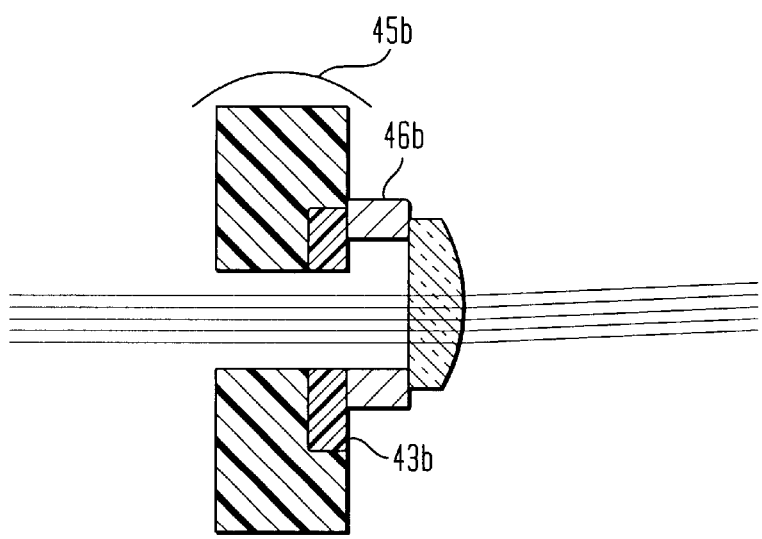
Figure 4C:
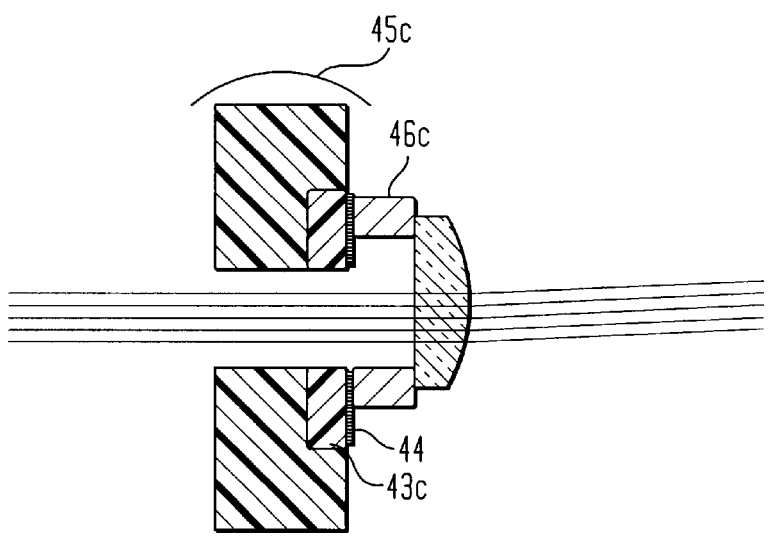

FIGS. 4*a*–4*c* illustrate variations as to how the weak lens's position can be magnetically fixed. For example, the roles of the magnetically permeable material and the permanent magnet can be reversed. In FIG. 4*a*, the wall 45*a* has been converted into a wall with a permanent magnet insert 43*a*. Now the lens 7 is attached to a lens holder in the form of a permeable ring 46*a*. It is of course contemplated that one could use a permanent magnet for lens holder 46*a* as well, but this is not preferred here because the cost of permanent magnets is greater than that of a simply permeable material, and the greater force that can be produced by coupling a permanent magnet to a permanent magnet is more than is needed and may result in greater friction than desired. This interchange of permeable material and permanent magnet is also exemplified in FIG. 4*c*.

In FIG. 4*b*, it is illustrated that the whole wall 45*b* need not be permeable when magnetic attraction is used between the wall and the lens holder. Instead, only the vicinity of the attaching region 43*b* needs to have permanent magnet(s) such as 46*b* and permeable material(s) such as 43*b* to provide magnetic attraction between the lens holder and the wall.

In FIG. 4*c*, it is illustrated that an interface region 44 can be provided between the support surface of wall 45*c* and the lens holder 46*c* at the vicinity of the permanent magnet 43*c*. In other words, an interface region 44 can be interposed between the lens holder and the support surface. Although the interface region 44 illustrated in FIG. 4*c* is most intimately associated with portion 43*c* of wall 45*c*, it may be associated with the end surface of holder 46*c* or with the whole wall 45*c*, or it may be distinct in its own right.

The interface region 44 is provided to form a fixed engagement between the lens holder and the support surface of the wall. The interface region can be epoxy that is still liquid (or uncured) during the time of the adjustment of the position of the lens holder 46*c* and lens 7 with respect to wall 45*c*, but that is subsequently cured by time, temperature, irradiation, or other means to make the position fixed or even permanent. Region 44 could also be provided by solder or other known means for mounting the lens with respect to the support surface. If epoxy is used, the viscosity of the epoxy or the friction between the components can be controlled during the time of adjustment to be neither too easy to move the parts with respect to each other nor too "stiff". The surface finish of the parts (e.g., the surface of wall portion 43*c* and the end surface of lens holder 46*c*) also can be controlled to optimize the friction and the performance of the optional bonding or fixing method.

Region 44 may contain a non-magnetically permeable layer to reduce the amount of magnetic attraction between the lens holder and the support surface, and thereby the amount of static friction that needs to be overcome to move the subassembly can be reduced. Additionally, one might use permeable or nonpermeable rolling elements such as spheres or cylinders as a component of region 44 to reduce static friction. These additions can be combined with the optional method of bonding. For example, one might use a combination of small glass or steel balls with epoxy to form the interface region 44.

It will be appreciated that interface region 44 provides a means for fixing the position of the lens with respect to the path of the optical beam. Most preferably, interface region 44 provides a fixing means that works in cooperation with the magnetic attraction between the lens holder and the support surface. Specifically, the magnetic attraction resists separation of the lens holder from the support surface, yet the magnetic attraction and the interface region permit sliding movement of the lens holder with respect to the support surface so that the relative position of the lens holder can be adjusted. After adjustment of the lens holder's position is completed, the interface region 44 is preferably adapted to form a fixed attachment between the components to prevent further movement. For example, if epoxy is used to form the interface region 44, then liquid or uncured epoxy cooperates in combination with the magnetic attraction to resist separation of the components while still permitting sliding movement therebetween so that an adjustment can be made. Thereafter, the epoxy cures (or is cured) to fix the relative positions of the lens holder and the support surface. Solder is an alternative to epoxy.

Figure 5:
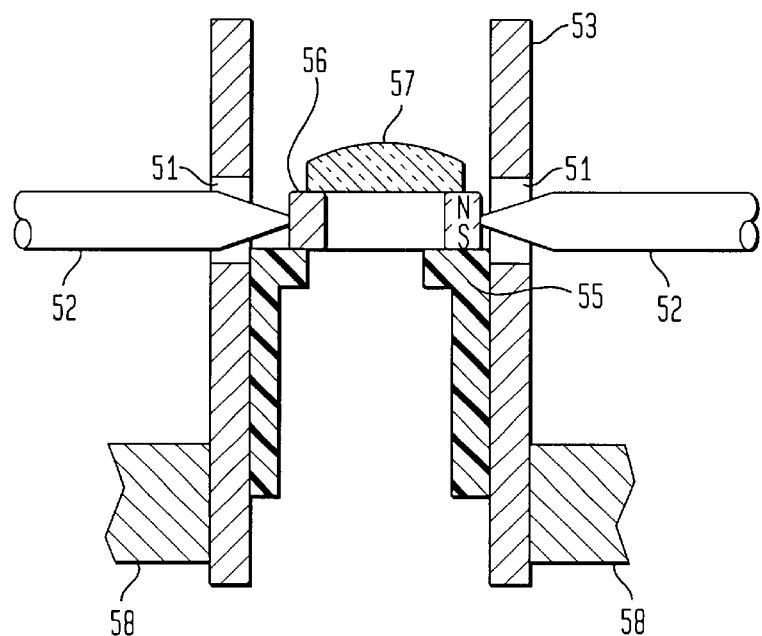
FIG. 5 is a cross-sectional side view of another embodiment of a lens assembly according to this invention, including mechanical means for moving the lens assembly.

Movement of the weak lens subassembly within the assembled or partially assembled package will now be described with reference to FIGS. 5–7. In FIG. 5 a mechanical means 52 is provided to push the subassembly of a lens holder 56 and a lens 57. Specifically, mechanical means 52 extend through access holes 51 placed about the side of the package enclosure 53. The rest of the package is held steady by clamps 58. By using a pair of mechanical jaws 52, one can hold the subassembly of lens holder 56 and lens 57 and move it in order to adjust the position of the lens holder 56 with respect to the wall 55. Although not shown in FIG. 5, it may be desirable to place mating features (such as spikes in holes or mating grooves) at the points of contact between the tips of jaws 52 and the outer surface of the lens holder 56 in order to improve the control of the lens holder. Alternatively, if one has access from at least three sides, three pushers separated by 120° can be provided, and one can merely push with one pusher 52 at a time to adjust the position of the lens holder. Four or more pushers could also be used. Especially if one reduces the friction between the lens holder 56 and the wall 55 as described previously, one may be able to use magnetic means to form an electromagnetic attraction or repulsion between the jaws and the lens holder to force adequate contact between one or more tools 52. Also, such electromagnetic attraction could be used to "pull" the lens holder as well as push.

Figure 6:
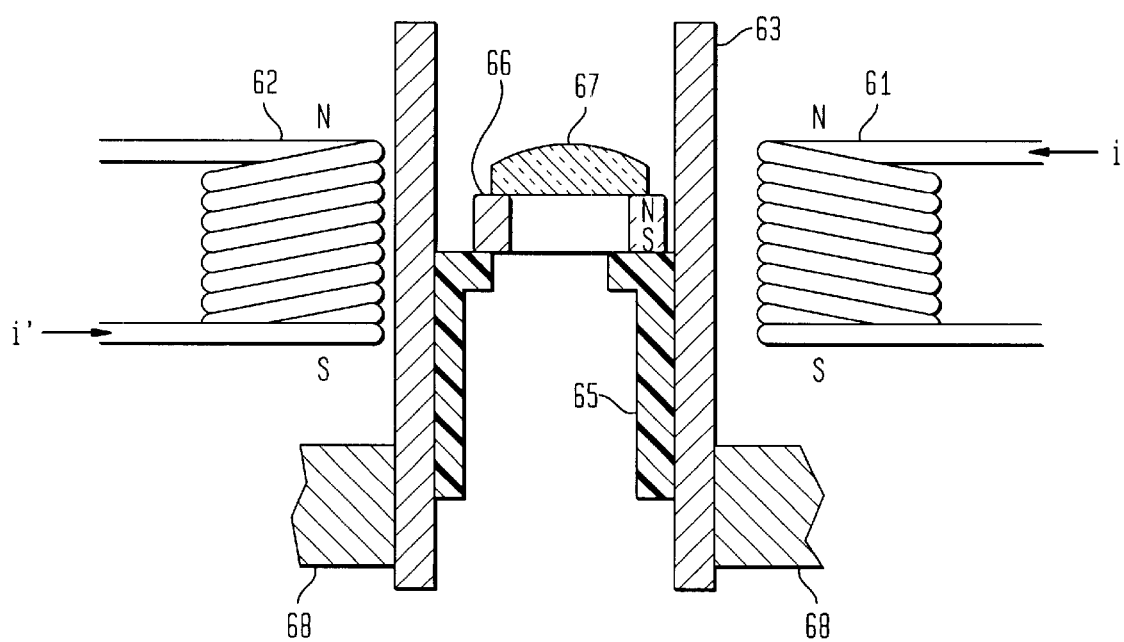
FIG. 6 is a cross-sectional side view of another embodiment of a lens assembly according to this invention, including electromagnetic means for moving the lens assembly.
Figure 7:
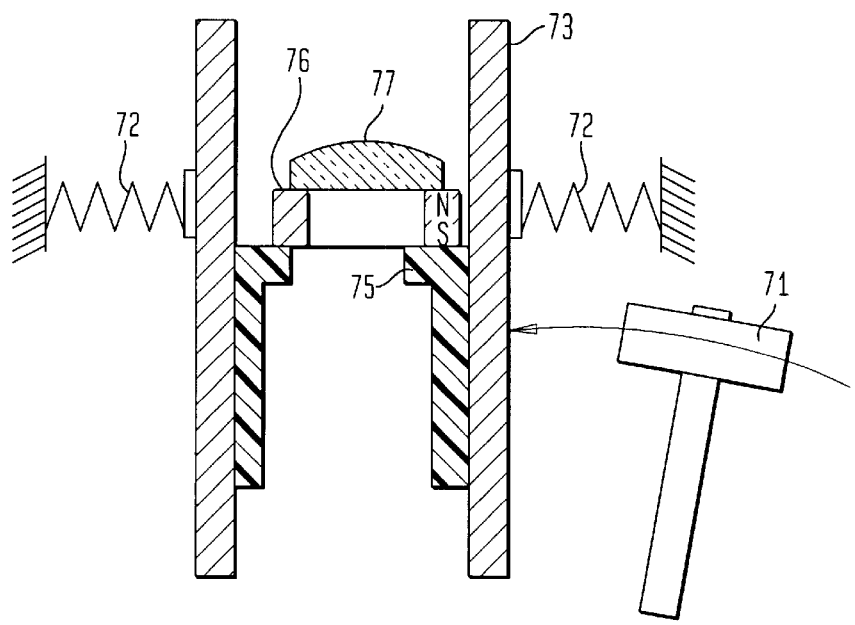
FIG. 7 is a cross-sectional side view of still another embodiment of a lens assembly according to this invention, including a hammer device for moving the lens assembly.

FIG. 6 illustrates an embodiment wherein the subassembly of magnetic lens holder 66 and lens 67 can be moved without the use of access holes in the package's enclosure. For example, it may be desired to adjust the position of the lens within an optical package that has been hermetically sealed or a package that does not provide access to the lens. By placing electromagnets 61, 62, etc. about the periphery of the package housing 63, forces can be exerted upon the permanent magnet of lens holder 66. The forces are not as precisely "placed" as they would be with mechanical contact as shown previously in FIG. 5. However, if a high current, short pulse, "i" is supplied through electromagnet 61, a transient magnetic field in electromagnet 61 will be produced, which will interact with the permanent magnet of lens holder 66. Because the permanent field and the transient fields are aligned north-to-north and south-to-south, the magnet of lens holder 66 will be repulsed from 61 and experience a sharp force to the left in FIG. 6. Assuming the force is large enough, it will overcome the static friction between contacting surfaces of lens holder 66 and wall 65. The subassembly of lens holder 66 and lens 67 will accelerate to the left at a rate depending upon the amount that the transient force exceeds the dynamic friction and the mass of the subassembly of lens holder 66 and lens 67. When the transient magnetic field produced by electromagnet 61 ceases, acceleration to the left of the lens assembly ceases and the lens assembly will decelerate to the left at a rate proportional to the dynamic friction between surfaces of wall 65 and lens holder 66.

By varying the size and duration of the current "i", one can vary the amount that the subassembly of lens holder 66 and lens 67 is moved to the left for each pulse. Of course, one should preferably hold the package steady, and clamps 68 can be used to hold the rest of the package relatively steady as the adjustment to the position of lens 67 is made.

Similarly one can magnetically push the lens holder subassembly to the right by supplying current pulses "i" to the electromagnet 62. Using additional electromagnets out of the plane of the page one can magnetically push the subassembly out of the plane of the page. By using current pulses of opposite polarity to those discussed, one can magnetically pull the subassembly in steps toward the energized electromagnet.

One should take care to avoid interference between the currents induced in the package and other transient magnetic fields during the adjustment process. In general, conductive loops (such as may be formed by package housing 63 or wall 65 in FIG. 6) may produce transient fields that oppose the change in magnetic flux through the loop. There may be significant transient forces generated between the conductive loops and the courses of magnetic fields. Reducing the conductivity and cross-sectional area of the current conducting regions will increase the resistance in the loop, thus reducing the induced currents. Also, reducing the rate of change of the transient magnetic fields will also reduce the induced currents.

If the package can withstand high accelerations and is relatively stiff, one can use mechanical impulses to move the subassembly of a lens holder and lens. For example, FIG. 7 illustrates how one can use mechanical impulses for adjustment. The package 73 is held loosely by means 72 so that it is relatively free to move. Tapping the package 73 with a hammer or other impact device 71 will cause the package 73 and most of its contents including wall 75 to rapidly but briefly accelerate to the left as shown in FIG. 7. To have the subassembly of holder 76 and lens 77 follow the acceleration of rest of the package, the frictionally supplied force between the support surface of wall 75 and the contacting surface of lens holder 76 has to equal m×a where "m" is the mass of the subassembly and "a" is the acceleration. If m×a is large enough, the force may exceed the static frictional force between wall 75 and lens holder 76; their surfaces will slide with respect to each other. After the initial tap by device 71 against package 73, the surfaces of device 71 and package 73 will generally separate (bounce apart) and the large but brief acceleration will cease and the relative motion between wall 75 and lens holder 76 will rapidly disappear. Thus, one can tap on different sides of the package 73 to provide repositioning of lens holder 76 relative to wall 75 in various directions. Providing additional taps at a particular side can produce multiple repositioning in a particular direction. In order avoid the need of a tapping device 71 that is moveable from one side to another, it may be more convenient to provide several different tapping devices situated at different sides of the package.

Referring now to FIGS. 8–12, several exemplary applications of the present invention are illustrated. FIG. 8 illustrates the use of the subassembly of lens holder 86 and lens 87 within an optical package 80 or sub-package containing a mirror element 81. The optics in such a package should be arranged so that the light exiting fiber 82 is coupled well to fiber 83. Both fibers 82 and 83 have their ends held in a dual fiber termination assembly 84. It is the intent that the optics of package 80 will focus the image of the end of fiber 82 directly onto the end of fiber 83.

Let us assume that the three degrees of adjustment present in package 80 are (1) the left-right positioning of the dual termination 84 by sliding it within sleeve 89, wherein sleeve 89 holds the strong ("collimating") lens 88; (2) the up-down motion of the subassembly consisting of the weak lens 87 and the lens holder 86; and (3) motion of the subassembly into and out from the page. Light (not shown) leaving the end of fiber 82 forms a diverging beam that passes through the strong lens 88 and becomes almost collimated as it continues on to the weak lens 87. Weak lens 87 completes the collimation of the beam and optionally changes its direction slightly. The collimated beam then reaches the reflecting surface 81 whereupon it reverses its general direction and starts traveling back toward the left, still collimated. The collimated light passes again through weak lens 87 after which it is not quite collimated. It then encounters strong lens 88 and is refocused into the end face of fiber 83.

If the adjustment of the distance between the dual termination 84 and the strong lens 88 is incorrect, then the final convergent image is not going to be in the plane of the dual fiber ends. Specifically, if the dual termination 84 is too close to the lens 88, then the diverging beam originating from the end face of 82 will still be diverging after passing through lenses 88 and 87 on the way to the reflecting element 81. After reflection it will still be diverging (instead of being collimated) as it approaches lenses 87 and 88 for the second pass. After the second pass through these lenses it will converge more slowly and will come to a focus further to the left than it should for correct operation.

Conversely, if the dual termination is too far away from lens 88, the image of fiber 82 will be further to the right than it should for proper operation. In proper operation the dual termination should place the fiber ends at the plane of coinciding object and image planes.

But having the image plane contain the end face of fiber 83 is not sufficient for best coupling. The image may be on a different point of the plane than the end face. Moving the subassembly lens holder 86 and lens 87 up and down will move the image position up and down. And similarly, moving the subassembly in and out of the page will move the image position in and out of the page. Thus moving the subassembly along wall 85 should provide the means to center the image on the end face of fiber 83, thereby maximizing the coupling.

Assuming that the reflecting surface 81 is flat, achieving the best coupling assures that the beam incident and reflected from 81 is precisely collimated. This is one way to produce a fiber optic collimator consisting of either of the fibers 82 and 83, and the two lenses, 88 and 87.

FIG. 9 illustrates a collimator assembly 90 that uses a single termination 94 of an optical fiber. Here, the coupling of light entering fiber 92 to that observed leaving fiber 93 is maximized when a fixed, flat reflector 91 is present. These two fibers 92 and 93 are connected to a fiber-optic splitter/combiner 102 that resembles a "Y" in construction. The base of 102 is connected (usually temporarily) to fiber 101. Fiber 101 leads to the single termination 94. Termination 94 is allowed to slide within a sleeve 99 during adjustment. The three adjustments used for maximizing the coupling are again the sliding of the termination 94 in the sleeve 99 and the movement in two dimensions of the subassembly of lens holder 96 and lens 97 along the wall 95. When maximum coupling is achieved, it is because the light that leaves the end face of 101 as a diverging beam (not shown) is collimated by the combination of strong lens 98 and weak lens 97 so that it is a collimated beam normally incident on 91. The reflected, collimated beam is refocused by a second pass through lenses 97 and 98 back to the end face of fiber 101. Usually, after assembly of collimator 90, one no longer employs the splitter/combiner 102 or the fixed reflector 91.

FIG. 10 illustrates an alternate way to make a single-fiber collimator 100 corresponding to the collimator 90 made in FIG. 9. This time, a collimated beam 103 coming from the extreme right and heading left is used. The light being collected by fiber 101 is monitored. One adjusts the position of termination 94 in sleeve 99 and also the position of the subassembly of lens holder 96 and lens 97 along the wall 95 so that the diffraction-limited spot formed by the focusing of beam 103 is centered on the end face of fiber 101. This occurs when a maximum optical power emerging from fiber 101 is obtained.

The advantage of the method illustrated in FIG. 10 is that the splitter/combiner 102 shown in FIG. 9 need not be used. On the other hand, the disadvantage of the method illustrated in FIG. 10 is that a collimated beam 103 is needed to begin with. Because the lens 97 is passed twice by the collimated beam (as shown in FIG. 9), the optimization curve can be "sharper" using the method of FIG. 9 as compared to the method of FIG. 10 where the weak lens 97 is passed only once by the beam.

FIG. 11 illustrates an exemplary application for a complete package 110. The package contains various optical components in the middle region 104. The overall major package shell is indicated at 105. One could assemble this package in order to maximize the coupling from input fiber 101 to output fiber 103. The shell 105 is first loaded with the optical components at 104. A collimator 100 can be made by either of the methods described in FIGS. 9 or 10. A collimator 106 is made in a similar manner. Collimator 100 is fixed into the shell 105, and collimator 106 is fixed into the other end of shell 105. An optical signal is introduced into the input fiber 101, and an optical power meter is used to measure light coupled to output fiber 103. The positions of the subassemblies of holder 96 and lens 97 and holder 116 and lens 117 are adjusted for maximum coupling from fiber to fiber. If the optics in 104 preserve collimation, one can use just four degrees of freedom to achieve maximum coupling. Four degrees of freedom may be needed to match tilts and offsets from input collimator 100 to output collimator 106.

These four degrees of freedom are provided by the adjustment of the positions of holders 96 and 116 with respect to walls 98 and 108, respectively. If there is some focussing or defocusing by the optics in 104, compensation may be made by adding two more degrees of freedom (to match beam diameters and degrees of divergence/convergence). These two additional degrees of adjustment freedom are provided by the positioning of the fiber terminations within their respective sleeves.

FIG. 12 illustrates yet another exemplary application. Specifically, FIG. 12 illustrates placement of a weak lens 127 in a region where the optical beam is not approximately collimated. The application illustrated in FIG. 12 provides a fine control of coupling the image and the end of a wave guide 121 to the end of a wave guide 122. Although illustrated here with fiber-optic wave guides, one or both of the wave guides could be from a PLC (Planar Lightguide Circuit). The optical beam 123 diverges out of the end of wave guide 121 and is converted to a converging beam 128 upon transmitting through a lens 124. Converging beam 128 passes through weak lens 127 before coming to a diffraction-limited focus as beam 129 upon the end of wave guide 122. If the optics are imperfect, then a completely "diffraction-limited focus" may not be achieved. Nevertheless, the use of a moveable, weak lens will still redirect the beam's best achievable focus as described here and elsewhere. The assembly illustrated in FIG. 12 makes it possible to perform lateral collective adjustments without moving either of the wave guides. If the distance from the weak lens 127 to the end of wave guide 122 is "s", then the motion reduction ratio is F/s, where F is the focal length of lens 127. The lateral adjustment, as described before, consists of moving the subassembly of holder 126 and lens 127,which are magnetically attached to a wall 125, along the surface of that wall 125.

Because it is good practice in optical designs to minimize and control stray reflections. It is preferred to use AR (Anti-Reflective) coatings on lens surfaces. Additionally, where the beam is nearly collimated, one should avoid having flat surfaces of a lens perpendicular to the beam, and the surfaces of the optics should not be mutually parallel.

Figure 2A:
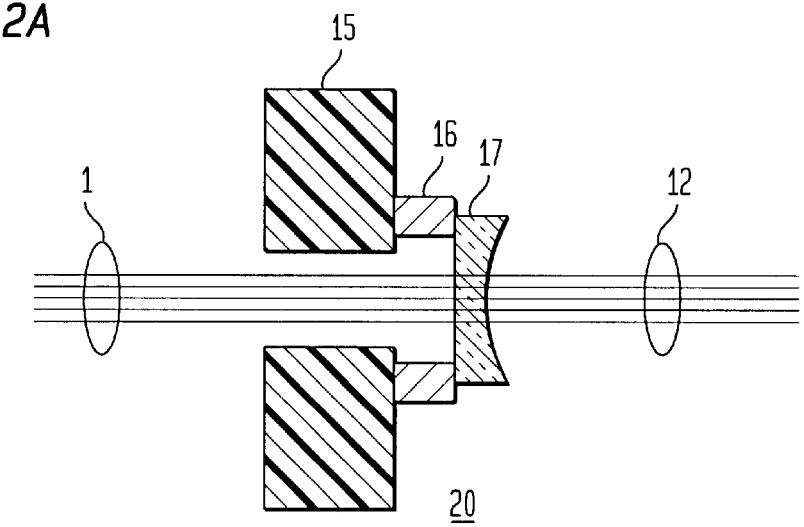
FIGS. 2a, 2b, and 2c are cross-sectional side views of a variation of the lens assembly illustrated in FIGS. 1a, 1b, and 1c.
Figure 2B:
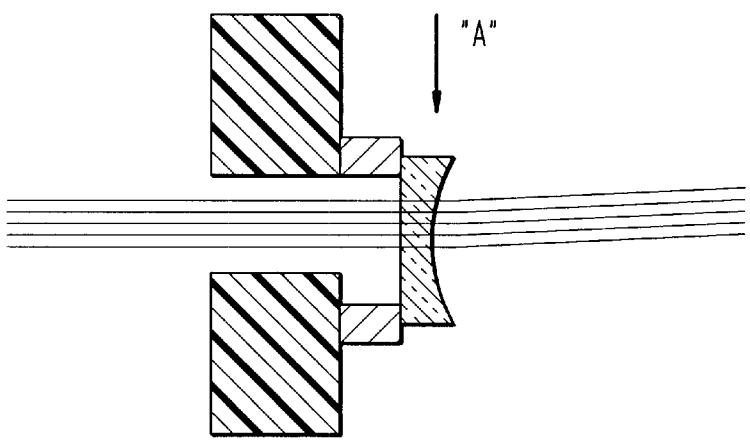
Figure 2C:
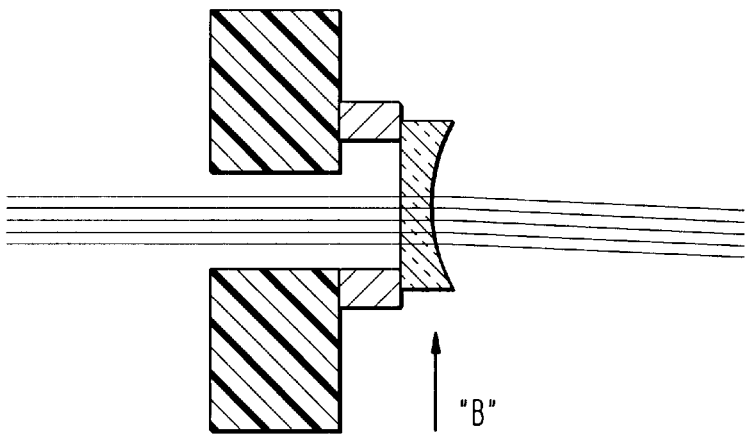

Thus, for example, in FIGS. 1a and 2a it is preferred for the precisely collimated beam to be on the right side of the weak lens (e.g., the side of the lens that is not flat). In FIG. 8, where the flat side of lens 87 faces the flat reflector 81, it is preferred for one or the other of these two surfaces to be slightly canted so that they are not closely parallel; were they to be parallel, Fabry-Perot interference effects could occur. Even if the beam is not collimated, it is preferred to avoid matching between the optic surfaces and the beam wave front. In FIG. 12, it is preferred to avoid surface of lens 27 that are spherical with its center of curvature at the end face of wave guide 122.

This invention has been described with reference to specific embodiments and modifications selected for illustration in the drawings. It will be appreciated that additional modifications and variations can be made within the spirit of the invention. Specifically, modifications can be made to the materials and configurations of the disclosed components, and components can be combined or broken down into further components depending upon manufacturing and cost considerations. The scope of the invention is defined separately in the appended claims.

What is claimed:

1. A lens assembly adapted to adjust the path of an optical beam originating from a fiber tip of a fiber-optic cable in a fiber-optic communication system, said lens assembly comprising a positive or negative lens positioned to extend across the path of the optical beam, said optical beam being free-of interruption in the optical path between the fiber tip of the fiber-optic cable and the lens, said lens being mounted for movement in a plane that traverses the path of the optical beam, and said lens being configured to redirect the optical beam upon movement of said lens in a direction along said plane.

2. A lens assembly as recited in claim 1, further comprising a support surface defining said plane, said lens being mounted adjacent said support surface for movement along said plane.

3. A lens assembly as recited in claim 2, further comprising means for attaching said lens to said support surface after the position of said lens with respect to said support surface is adjusted.

4. A lens assembly as recited in claim 3, wherein said means for attaching is selected from the group consisting of an adhesive, solder, and a weld.

5. A lens assembly as recited in claim 2, further comprising a lens holder to which said lens is mounted, said lens holder having an end portion positioned for sliding contact with said support surface.

6. A lens assembly as recited in claim 5, wherein said lens holder is magnetic and said support surface is magnetically permeable, and wherein a magnetic force generated between said lens holder and said support surface is sufficient to resist movement of said lens holder with respect to said support surface.

7. A lens assembly as recited in claim 5, wherein said lens holder is magnetically permeable and said support surface is magnetic, and wherein a magnetic force generated between said lens holder and said support surface is sufficient to resist movement of said lens holder with respect to said support surface.

8. A lens assembly as recited in claim 2, further comprising an interface interposed between said lens and said support surface, said interface being configured to permit adjustment of said lens with respect to said support surface and to prevent movement of said lens with respect to said support surface after the position of said lens is adjusted with respect to said support surface.

9. A lens assembly as recited in claim 1, said lens being a positive lens.

10. A fiber-optic communication system comprising:
   a fiber-optic cable configured to transmit an optical beam along a path, said fiber-optic cable having an end portion from which said optical beam can be transmitted;
   a primary lens positioned along the path of the optical beam and spaced from said end portion of said fiber-optic cable, said primary lens having a focal length selected to converge or diverge the optical beam as it passes through said primary lens; and
   a secondary lens positioned along the path of the optical beam and spaced from said primary lens, said secondary lens having a focal length that is larger than that of said primary lens, said secondary lens being mounted for movement in a plane that traverses the path of the optical beam, and said secondary lens being configured to adjust the path of the optical beam upon movement of said secondary lens in a direction along said plane.

11. A fiber-optic communication system as recited in claim 10, further comprising a support surface defining said plane, said secondary lens being mounted adjacent said support surface.

12. A fiber-optic communication system as recited in claim 10, further comprising a lens holder to which said secondary lens is mounted, said lens holder having an end portion positioned for sliding contact with said support surface.

13. A fiber-optic communication system as recited in claim 10, wherein said secondary lens is a weak lens having a focal length at least about 20 times that of said primary lens.

14. A fiber-optic communication system as recited in claim 10, wherein said secondary lens is a weak lens having a focal length at least about 100 times that of said primary lens.

15. A fiber-optic communication system as recited in claim 10, further comprising a deflecting surface for deflecting the optical beam, said secondary lens being positioned between said primary lens and said deflecting surface.

16. A fiber-optic communication system as recited in claim 10, wherein the position of said end portion of said fiber-optic cable is adjustable along the axis of said cable, and wherein said path of the optical beam is adjustable in three dimensions by movement of said end portion of said fiber-optic cable along said axis and movement of said secondary lens along said plane.

17. A method for adjusting the path of an optical beam transmitted from an end portion of a fiber-optic cable, said method comprising the steps of:
   (a) providing a primary lens having a focal length selected to converge or diverge the optical beam as it passes through the primary lens;
   (b) positioning the primary lens along the path of the optical beam and spacing the primary lens from the end portion of the fiber-optic cable;
   (c) providing a secondary lens having a focal length that is larger than that of the primary lens, the secondary lens being configured to redirect the optical beam;
   (d) positioning the secondary lens along the path of the optical beam and spacing the secondary lens from the primary lens, the secondary lens being moveable along a plane that traverses the path of the optical beam; and
   (e) moving the secondary lens in a direction along the plane, thereby adjusting the path of the optical beam.

18. A method as recited in claim 17, wherein the secondary lens is mounted to a lens holder, and wherein the step of moving the secondary lens comprises generating a force sufficient to move the lens holder with respect to the path of the optical beam.

19. A method as recited in claim 17, wherein the step of moving the secondary lens comprises generating a mechanical force sufficient to move the secondary lens with respect to the path of the optical beam.

20. A method as recited in claim 17, further comprising the step of moving the end portion of the fiber-optic cable to adjust the path of the optical beam.

* * * * *